D. A. JOHNSON.
Devices to Prevent Horses from Straying.

No. 151,134. Patented May 19, 1874.

Witnesses,
N. W. Stearns
W. J. Cambridge

Inventor,
Daniel A. Johnson

UNITED STATES PATENT OFFICE.

DANIEL A. JOHNSON, OF BOSTON, MASSACHUSETTS, ASSIGNOR TO HIMSELF AND JOSEPH F. PRAY, OF SAME PLACE.

IMPROVEMENT IN DEVICES TO PREVENT HORSES FROM STRAYING.

Specification forming part of Letters Patent No. 151,134, dated May 19, 1874; application filed March 18, 1874.

*To all whom it may concern:*

Be it known that I, DANIEL A. JOHNSON, of Boston, in the county of Suffolk and State of Massachusetts, have invented a device to be used as a substitute for a weight or hitch-strap, to prevent horses from straying or running away, of which the following is a full, clear, and exact description, reference being had to the accompanying drawings making part of this specification, in which—

Figure 1:
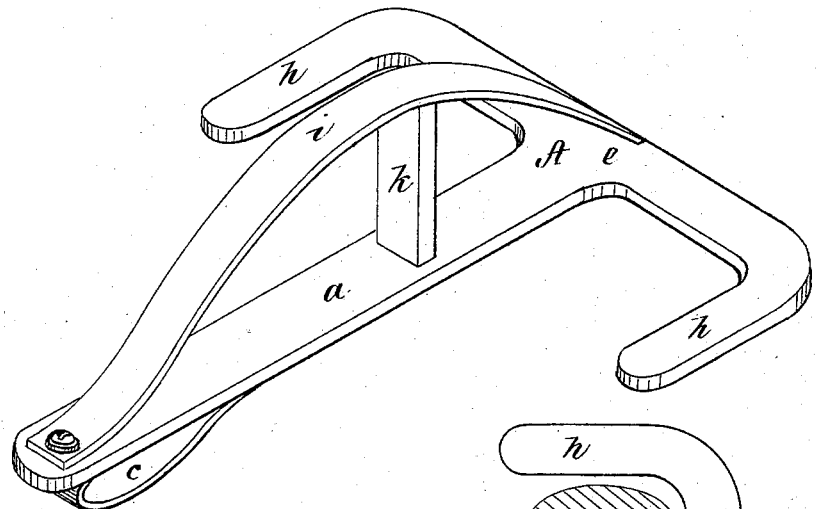
Figure 2:
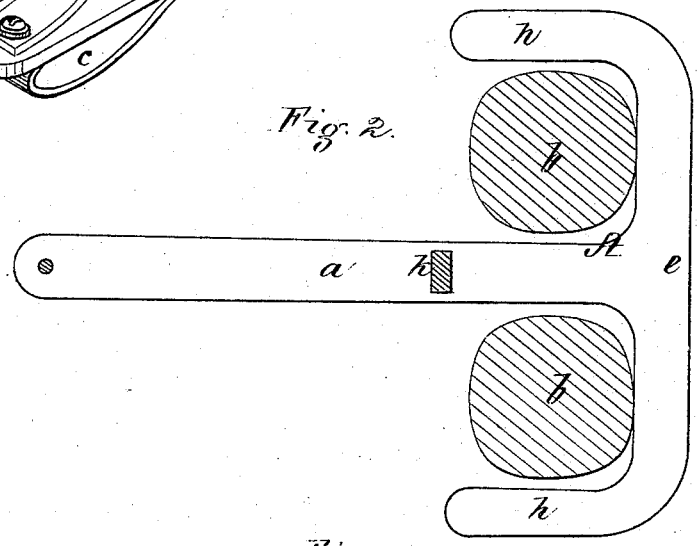
Figure 3:
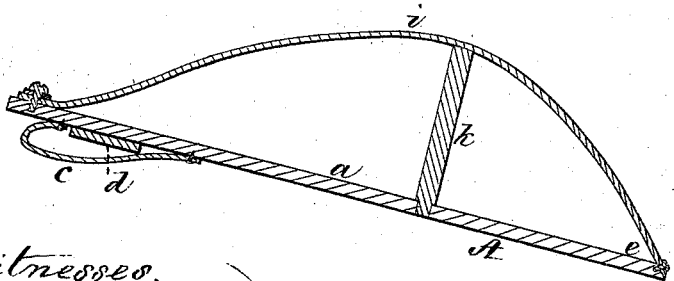

Figure 1 is a perspective view of my said device. Fig. 2 is a horizontal section through the same, applied to a horse's forward legs. Fig. 3 is a vertical section.

Where horses are required to remain standing in a given position while the driver is temporarily absent weights or hitch-straps are ordinarily employed. The weight is, however, objectionable, for the reason that it is heavy and inconvenient to carry about, and is unsafe for the horse, while the hitch-strap is frequently broken.

To provide a substitute for a weight or hitch-strap is the object of my invention; which consists in a T-shaped yoke, made of rigid material, which is to be attached to one of the girts, and projects out between and in front of the horse's forward legs, whereby the horse is prevented from raising them from the ground, and moving either forward or back from the position in which he is left, the front portion of the yoke also extending around the sides of the legs, and serving as a guard to prevent the horse from working one or both legs in front of the yoke.

To enable others skilled in the art to understand and use my invention, I will proceed to describe the manner in which I have carried it out.

In the said drawings, A is a T-shaped yoke, the longitudinal portion $a$ of which is intended to pass between the forward legs $b$ of a horse, at their junction with the breast, the rear end of the portion $a$ being provided with a loop, $c$, or other suitable device, by which it may be secured in any convenient manner to the girt $d$. The front of the yoke is bent around in the form of the top of the letter T, and passes n front of and around the sides of the horse's forward legs $b$ $b$, the transverse or front portion $e$ of the yoke dropping, by its gravity, down thereon, in such manner as to hug snugly thereto, and offer a resistance to the lifting of the feet when the horse attempts to move forward or back. The portions $h$ of the yoke extend around outside the sides of the legs, and serve as guards to prevent the horse from getting into a position that will enable him to work one or both of his legs forward of the portion $e$ of the yoke, and thus allow him to recover the free use of his limbs, and also prevent him from moving laterally to the right or left. From the rear of the portion $a$ to the center of the front of the portion $e$ extends a curved strip, $i$, provided with a brace, $k$, for supporting and keeping it in position. This curved strip bears on the under side of the breast, and serves as a depressor, and, by its contact therewith, prevents the front portion $e$ from being moved up to the top of the legs, which might result from the horse endeavoring to move forward, and would allow him to have more freedom, any tendency of the front portion $e$ to work up into a position to allow the horse to move being counteracted by the curved strip $i$ being pressed forcibly up against the horse's breast.

In the application of my invention to some horses, the weight of the front portion $e$ of the yoke will be found sufficient to insure its being kept snugly down on the legs, and consequently the depressor $i$ may be dispensed with without departing from the spirit of my invention; but I prefer the construction herein shown and described.

What I claim as my invention, and desire to secure by Letters Patent, is—

The T-shaped yoke A, made of rigid material, with or without the depressor $i$, operating substantially in the manner and for the purpose set forth.

Witness my hand this 12th day of March, 1874.

DANIEL A. JOHNSON.

In presence of—
N. W. STEARNS,
W. J. CAMBRIDGE.